US007002909B2

(12) United States Patent
Hagopian et al.

(10) Patent No.: US 7,002,909 B2
(45) Date of Patent: Feb. 21, 2006

(54) ZERO DATA LOSS NETWORK PROTECTION

(75) Inventors: John Hagopian, Harwood, MD (US); Lee Daniel Feinberg, Silver Spring, MD (US); Walter A. Rau, Jr., Ellicott City, MD (US)

(73) Assignee: Dorsal Networks, Inc., Columbia, MD (US)

( * ) Notice: Subject to any disclaimer, the term of this patent is extended or adjusted under 35 U.S.C. 154(b) by 937 days.

(21) Appl. No.: 09/911,859

(22) Filed: Jul. 25, 2001

(65) Prior Publication Data
US 2003/0020978 A1  Jan. 30, 2003

(51) Int. Cl.
*H04B 10/08* (2006.01)
*H04J 3/14* (2006.01)

(52) U.S. Cl. .................. 370/228; 370/244; 398/5; 398/19

(58) Field of Classification Search ............... 370/218, 370/222, 228, 237, 244, 415; 398/25, 5, 398/19; 714/43
See application file for complete search history.

(56) References Cited

U.S. PATENT DOCUMENTS

| | | | | |
|---|---|---|---|---|
| 5,241,534 A | * | 8/1993 | Omuro et al. .............. 370/218 |
| 5,745,476 A | * | 4/1998 | Chaudhuri .................. 370/222 |
| 6,011,780 A | * | 1/2000 | Vaman et al. ............... 370/237 |
| 6,134,032 A | | 10/2000 | Kram et al. |
| 6,163,526 A | * | 12/2000 | Egoshi ....................... 370/228 |
| 6,205,562 B1 | * | 3/2001 | Fukushima et al. ........... 714/43 |
| 6,307,986 B1 | * | 10/2001 | Duerksen et al. ............ 385/24 |
| 6,321,004 B1 | * | 11/2001 | Duerksen et al. ............ 385/24 |
| 6,323,981 B1 | | 11/2001 | Jensen |
| 6,426,941 B1 | * | 7/2002 | Vaman et al. ............... 370/228 |
| 6,515,962 B1 | * | 2/2003 | Sawey et al. ............... 370/228 |
| 6,563,613 B1 | * | 5/2003 | Tochio ....................... 398/25 |
| 6,741,572 B1 | * | 5/2004 | Graves et al. ............. 370/254 |
| 6,765,874 B1 | * | 7/2004 | Carder et al. ............... 370/244 |
| 2002/0176432 A1 | * | 11/2002 | Courtney et al. ........... 370/415 |

OTHER PUBLICATIONS

R. A. Jensen and B. S. Jackson, *Line Monitoring of Undersea Systems*, AT&T Submarine Systems, Inc., pp. 160-163, 1995, Holmdel, New Jersey.
Daniel T. Van Atta et al., AT&T Technical Journal, Jan./Feb. 1995, vol. 74, No. 1.
Ellen Brain et al, *Ten Years of Operating Light Wave Systems*, AT&T Submarine Systems, Inc., pp. 203-209, 1995, Morristown, New Jersey.
C. De Maindreville, Didier Moity, *Submarine Network Management: Architectural Issues*, Alcatel Submarine Networks, Nazay, France.

* cited by examiner

Primary Examiner—Alpus H. Hsu

(57) ABSTRACT

A system and method for protecting from the loss of data in an optical data network includes receiving the data over a service optical fiber line, delaying reception of the data over a protection optical fiber line by a first delay amount with respect to the reception of the data over the service optical fiber line, and detecting a fault condition in the service optical fiber line. In response to the detection of the fault condition, the transmission of data over the protection optical fiber line is received. The first delay amount corresponds to at least the amount of time to switch to the reception of the data over the protection optical fiber line from the reception of the data over the service optical fiber line after the detection of the fault condition.

26 Claims, 8 Drawing Sheets

ZERO DATA LOSS NETWORK PROTECTION

FIELD OF THE INVENTION

The present invention relates generally to optical communications, and more particularly to a system and method for protecting the loss of data in an optical communication system when a fault occurs.

BACKGROUND OF THE INVENTION

Current network architectures are configured to allow optimal transmission of binary data in the digital and optical domain. Network users typically require varying degrees of protection for the transmission of the data depending on the applications being used by the particular network user. For example, some users may not need any protection for low priority data applications, and therefore can withstand multiple interruptions for extended periods of time. Other users, however, may be using high priority data applications that require immediate protection of the data traveling over a service optical fiber line.

Protection for data traveling over the service optical fiber line, i.e., service data, may be achieved by alternately routing the service data through unaffected equipment and transmission lines when a hardware fault occurs. After detecting the fault, the existence of the fault is typically communicated to an element management processor or a similar element in a network management system, which executes control algorithms to implement the re-routing of the data. To implement the re-routing of the data, a switch is effected to a protection route. The process of detecting the fault, communicating the existence of the fault and switching to a protection route results in a certain amount of delay between the detection of the fault and the re-routing of the data.

FIG. 1 illustrates a network protection system for a ring architecture of an optical network. As shown in FIG. 1, the network protection system 10 includes a plurality of line terminating equipment (LTE) 12, 14, 16 and 18, service rings 22 and 26, protection rings 24 and 28, and a network management system (NMS) 20. In the example shown in FIG. 1, a fault occurs between LTE 12 and LTE 14 in the form of a fiber cut. As a result of the fiber cut, LTE 14 will see a variety of out of tolerance conditions for data received from LTE 12 over service ring 22, which is communicated to the NMS 20. The NMS 20 implements a switch to the protection ring 24 in the transmission from LTE 12 and in the reception at LTE 14. A similar situation occurs in reverse for the service ring 26 and the protection ring 28.

Between the time that the fault is detected and the switch is made to the protection ring from the service ring, there is a delay time $T_D$. The delay time $T_D$ is the sum of the following times: fault detection time $T_{FD}$; communication time to the NMS 20 $T_{C1NMS}$; decision time by the NMS 20 $T_{NMSD}$; communication time to the transmitting LTE 12 for switching transmission $T_{C2NMS}$; switching time at the transmitting LTE 12 $T_{SW1}$; communication time to the receiving LTE 14 for switching reception $T_{C3NMS}$; and switching time at the receiving LTE 14 $T_{SW2}$. When a fault occurs at a time $T_0$, the next data received is the data sent at time $T_0+T_D$. As a result, the data transmitted between the time $T_0$ and the time $T_0+T_D$ is lost.

Among the different times contributing to the delay time $T_D$ the fault detection time $T_{FD}$ may be very short, but the time to communicate the fault to the NMS 20, $T_{C1NMS}$, such as with an emergency flag propagating through control layers of the network protection system 10, can be significant. After receiving the flag, the NMS 20 decides what action to take. Since many other alarms may be received simultaneously, a latency period may occur before any action is taken, which increase the decision time $T_{NMSD}$ by the NMS 20. Once the NMS 20 has determined the response to the fault, the NMS 20 communicates the response to the affected LTEs, which trigger the appropriate switches. Although optical switches have fairly fast response times, resulting in relatively short switch times $T_{SW1}$ and $T_{SW2}$, there is typically a significant delay with respect to the times $T_{C2NMS}$ and $T_{C3NMS}$ for the NMS 20 to communicate the switches to the LTEs.

FIG. 2 is a block diagram of a conventional network protection system for a 1+1 configuration of an optical network. As shown in FIG. 2, the optical network includes transmission protocol devices 32, 34 and 44, line terminal equipment (LTE) 36, 38 and 40, a protection switch 42, a service line 46 and a protection line 48. The 1+1 configuration of FIG. 2 provides for the simultaneous and synchronous transmission of data through the service line 46 and the protection line 48.

In the optical network, the same data signals are received by the transmission protocol devices 32 and 34 for the service line 46 and the protection line 48, respectively. The data signals output from the transmission protocol devices 32 and 34 are respectively received by the LTEs 36 and 38. The LTEs 36 and 38 each combine the data signals into a single multiplexed signal (WDM signal) and transmit the WDM signal respectively over the service line 46 and protection line 48. The WDM signal from the service line 46 is received by the LTE 40, which demultiplexes the WDM signal into the respective data signals and outputs the data signals to the transmission protocol device 44. The WDM signal output from the protection line 48 is received by the protection switch 42, which selectively switches the WDM data signal from the protection line 48 to the LTE 40 in response to the detection and processing of a fault in the service line 46.

Like the ring architecture of FIG. 1, there is a delay time $T_D$ between the time a fault is detected in the service line and the time the switch in the protection switch 42 is made to provide the WDM data signal from the protection line 48 to the LTE 40. Consequently, the 1+1 configuration shown in FIG. 2 also loses the data that would have been received over the service line 46 during the delay time $T_D$.

SUMMARY OF THE INVENTION

Briefly, in one aspect of the invention, a method for protecting from the loss of data in an optical data network includes receiving the data over a service optical fiber line, delaying reception of the data over a protection optical fiber line by a first delay amount with respect to the reception of the data over the service optical fiber line, and detecting a fault condition in the service optical fiber line. In response to the detection of the fault condition, the transmission of data over the protection optical fiber line is received. The first delay amount corresponds to at least the amount of time to switch to the reception of the data over the protection optical fiber line from the reception of the data over the service optical fiber line after the detection of the fault condition.

In another aspect of the invention, the delaying includes storing a first amount of the data in a buffer coupled to the protection optical fiber line, the first amount of the data corresponding to at least the amount of data that is transmitted over the service optical fiber line during the first delay amount.

In yet another aspect of the invention, a system for protecting from the loss of data in an optical data network includes a transmitting terminal which transmits the data, a receiving terminal which receives the data transmitted by the transmitting terminal, a service optical fiber line which propagates the data from the transmitting terminal to the receiving terminal, and a protection optical fiber line which propagates the data from the transmitting terminal to the receiving terminal. The system also includes a switch, coupled to the receiving terminal and to the service and protection optical fiber lines, the switch providing data to the receiving terminal from the service optical fiber line during normal operation and from the protection optical fiber line when a fault is detected in the service optical fiber line, and a delay circuit for delaying the transmission of the data propagating on the protection optical fiber line, the delay circuit imparting a delay amount at least equal to an amount of time between the detection of the fault in the service optical fiber line and the switch providing data to the reception circuit from the protection optical fiber line.

DETAILED DESCRIPTION OF THE PREFERRED EMBODIMENT

Figure 1:
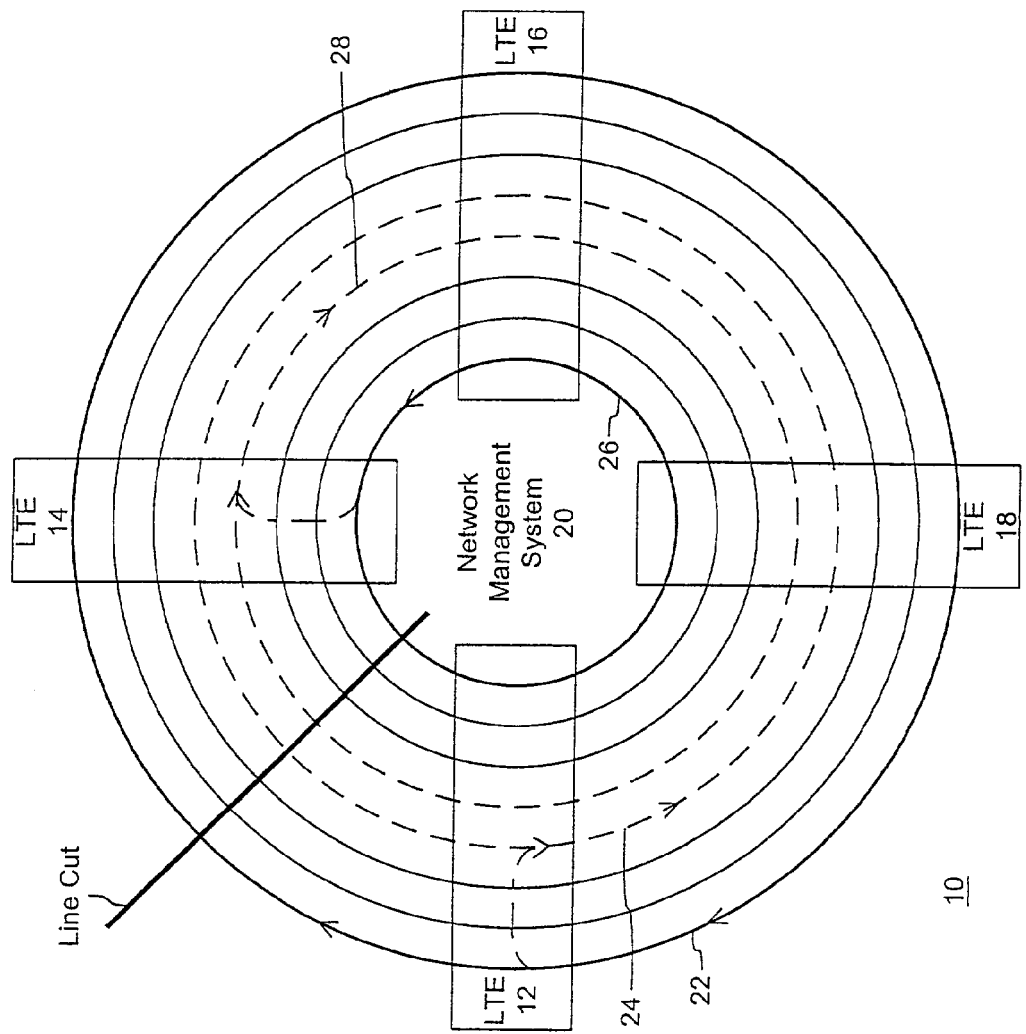
FIG. 1 shows a conventional network protection system for a ring architecture of an optical network.
Figure 2:
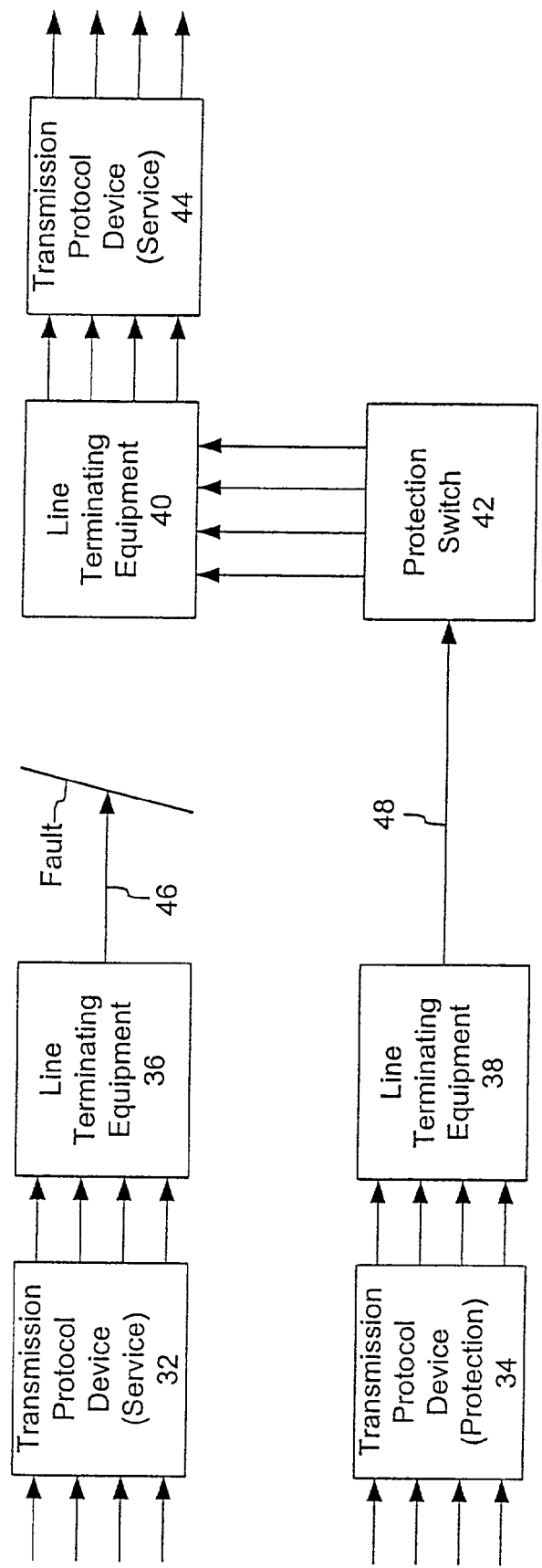
FIG. 2 is a block diagram of a conventional network protection system for a 1+1 configuration of an optical network.
Figure 3:
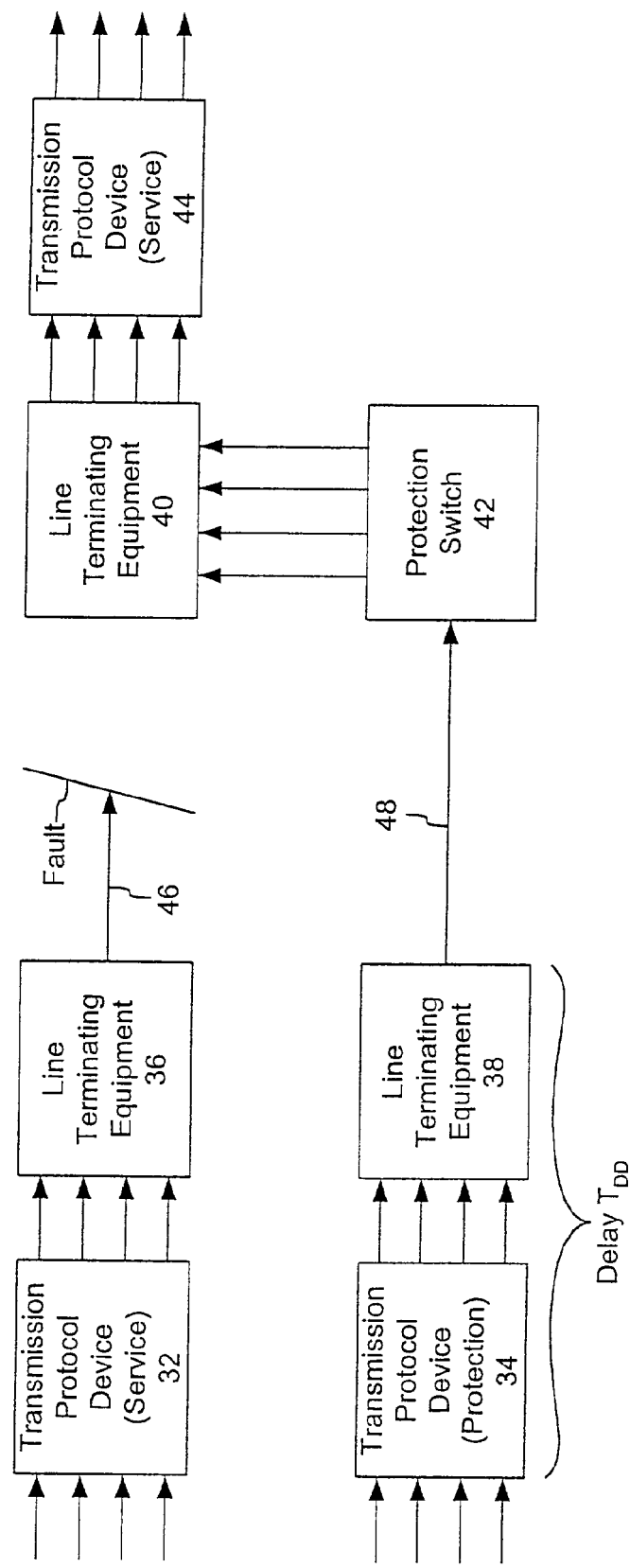
FIG. 3 is a block diagram of a zero data loss network protection system consistent with the present invention.

FIG. 3 is a block diagram of a zero data loss network protection system consistent with the present invention. Like the architecture of FIG. 2, the system of FIG. 3 includes transmission protocol devices 32, 34 and 44, line terminal equipment (LTF) 36, 38 and 40, a protection switch 42, a service line 46 and a protection line 48. The devices 32, 34 and 44 may be implemented as SONET and SDH boxes or an IP router. Alternatively the devices 32, 34 and 44 may be implemented using Multi-Protocol Data Label Switching (MPLS), General MPLS (GMPLS) or other networking schemes. The architecture of FIG. 3 illustrates a 1+1 configuration that provides for the simultaneous transmission of data through the service line 46 and the protection line 48. The zero data loss network protection system is equally applicable to other optical architectures, such as the ring architecture of FIG. 1 or a collapsed ring architecture.

As described above, when a fault is detected on a service path, data is either rerouted over a protection path, such as in a ring architecture, or a switch is made to receive data over a simultaneously transmitting protection path, such as in a 1+1 architecture. In either situation, there is a delay time $T_D$ between the time the fault is detected and the time the switch is made to receive data over the protection path. As a result of the delay, data is lost that would have been transmitted over the service path during the delay time $T_D$.

As shown in FIG. 3, a data delay amount $T_{DD}$ is imparted to the data signals received by the transmission protocol device 34 and the LTE 38 with respect to the data signals received by the transmission protocol device 32 and the LTE 36. The data delay $T_{DD}$ delays the transmission or reception of the signals traveling on the protection line 48 by at least the delay amount $T_D$ corresponding to the detection of a fault and the switch to receiving the data from the protection line 48. Although the data delay $T_{DD}$ may be equal to the delay amount $T_D$, the data delay $T_{DD}$ is preferably set to an amount sufficiently larger than the delay amount $T_D$ to ensure that no data is lost if the delay amount $T_D$ should increase. During normal operation, the LTE 40 receives the WDM signal, which corresponds to the data signals received by the LTE 36, from the LTE 46 over the service line 46. When a fault is detected, however, protection switch 42 switches to provide the WDM signal from the LTE 38 over the protection line 48 to the LTE 40.

Figure 4:
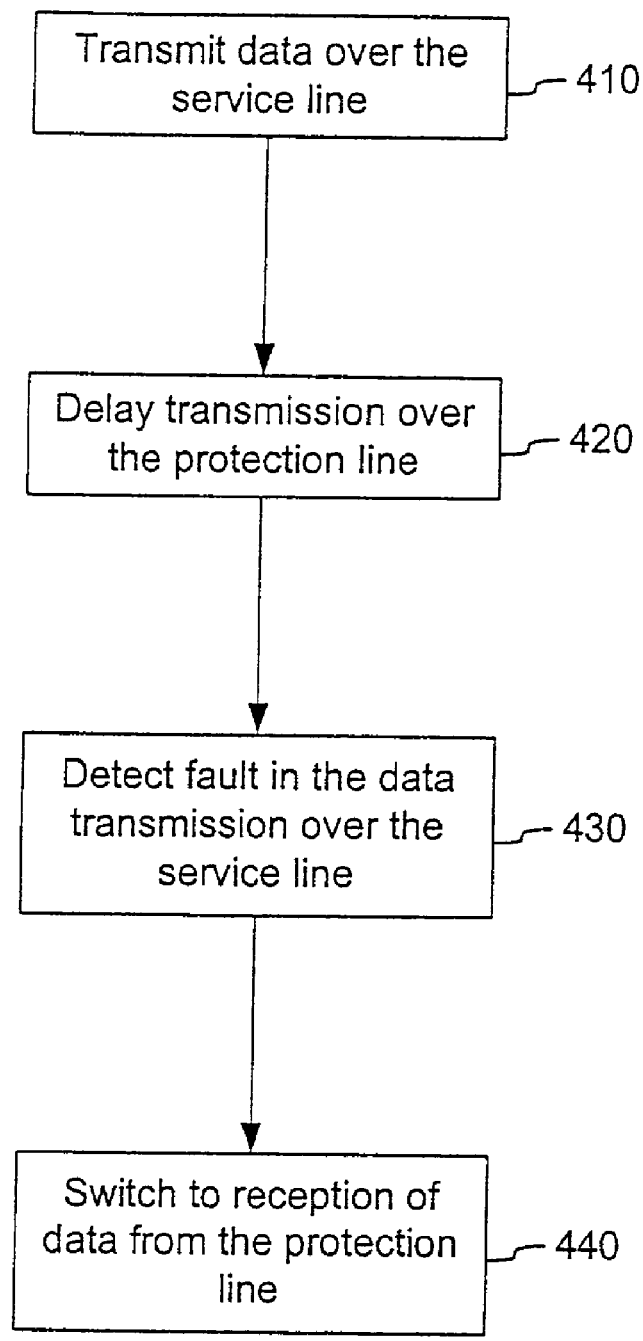
FIG. 4 is a flow diagram for a zero data loss process consistent with the present invention.

FIG. 4 is a flow diagram for a zero data loss process consistent with the present invention. The process shown in FIG. 4 is applicable to the zero data loss network protection system of FIG. 3. As shown in FIG. 4, data is transmitted over the service line 46 (step 410). The data transmitted over the service line 46 may be a WDM signal output from the LTE 36, which receives multiple optical signals from the transmission protocol device 32.

Data is also simultaneously transmitted over the protection line 48 but is delayed with respect to the transmission of data over the service line 46 (step 420). The data delay amount $T_{DD}$ imparted to the data transmitted over the protection line 48 is at least as much as the delay amount $T_D$ corresponding to the time a fault is detected in the service line 46 and the time a switch is made to receive data over the protection line 48. As described below, the data delay amount $T_{DD}$ may be imparted using a delay circuit implemented in the transmission protocol device 34, the LTE 38, or independent of either one anywhere along the protection path between the transmission protocol device 34 and the LTE 40.

During normal operation of the zero data loss network protection system, the protection switch 42 is set to have the LTE 40 receive a data signal, such as a WDM data signal, over the service line 46 from the LTE 36. The protection switch 42 remains in this setting until a fault is detected in the transmission of the data signal over the service line 46 (step 430). The detection of the fault may be determined by using, for example, an optical signal analyzer (OSA) implemented in the LTE 40, which identifies a variety of out of tolerance conditions for data received by the LTE 40 and communicates the fault to an NMS.

In response to the detection of the fault in the service line, a switch is effected to received data from the protection line 48 instead of the service line 46 (step 440). With reference to FIG. 3, the protection switch 42 is set to provide the data signal from the protection line 48 to the LTE 40. The setting of the protection switch 42 may be controlled by the NMS according to the detected fault.

When the switch is made to receive the data signal from the protection line 48 instead of the service line 46, the data delay amount $T_{DD}$ imparted to the data signal on the protection line 48 ensures that no data is lost during the delay time $T_D$ between the time the fault is detected and the time the switch is made. However, some of the data received over the protection line 48 may overlap with the last part of the data signal received over the service line 46.

Figure 5:
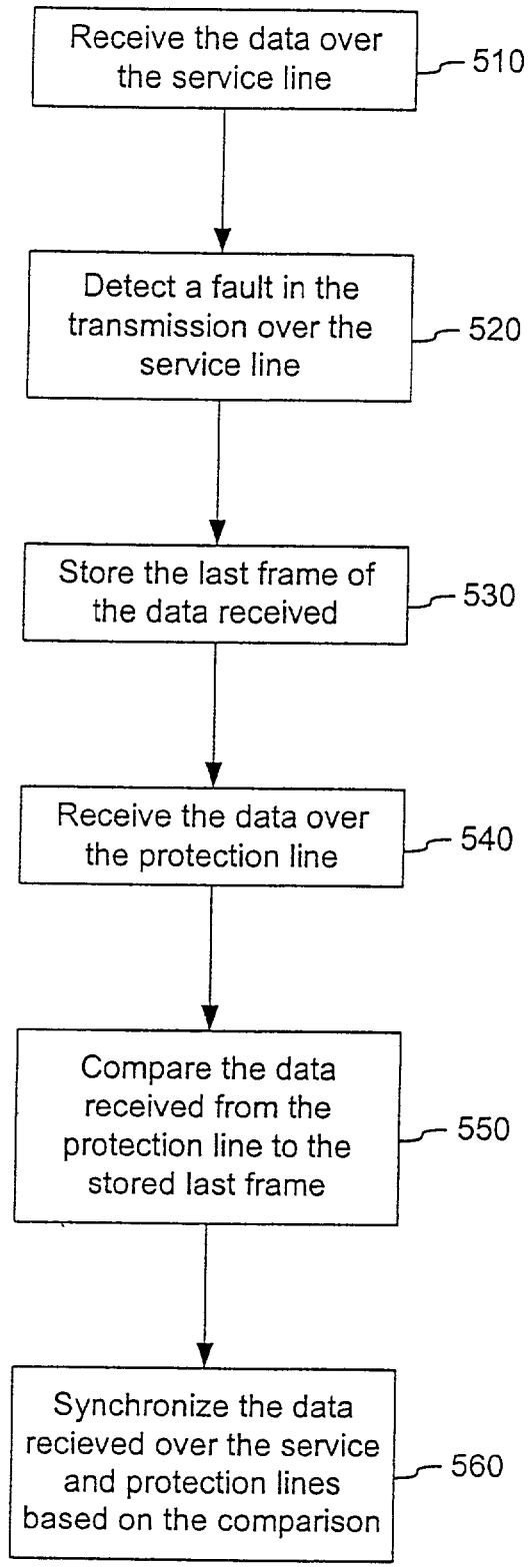
FIG. 5 is a flow diagram for synchronizing the data after a fault occurs in the system of FIG. 4, consistent with the present invention.

To compensate for the overlap, the last bits of the data signal received over the service line 46 may be synchronized with the first bits of the data signal received over the protection line. FIG. 5 is a flow diagram for synchronizing the data after a fault occurs in the system of FIG. 4, consistent with the present invention. As shown in FIG. 5, after receiving the data over the service line 46 (step 510) and then detecting a fault in the transmission over the service line 46 (step 520), the last bits or frame of data received over the service line 46 are stored (step 530).

The storage of the last bits or frame of data may be done continuously during normal operation or only after the detection of the fault. If done continuously, a delay in the reception of the data from the service line 46 may be avoided by providing a separate path to the storage from the normal communication path. If the format of the transmitted data includes frames, then a frame may be stored. If the format of the transmitted data does not include frames or similar blocks of data, then a set amount of data may be stored, such as the amount of data transmitted over a particular amount of time. The data may be stored in an optical buffer or a digital storage device, such as an SDRAM chip. The storage device may be implemented in the LTE 40, the transmission protocol device 44 or between the two devices.

As described above, in response to the detection of the fault, a switch is made to receive the data from the protection line 48 (step 540). The data received from the protection line 48 is then compared to the data from the service line 46 that had previously been stored (step 550). The comparison is made to identify where the data from the service line 46 and the protection line 48 match. The comparison circuit may include digital logic devices as are known in the art to determine where there is a match. To make the comparison, the data received from the protection line 48 may first be buffered in a storage device.

Based on the result of the comparison, the data received over the service line 46 at the time of the fault can be synchronized with the data received over the protection line 48 after the fault (step 560). The data can be synchronized by forwarding the data from the protection line 48 that is received after the matching data and deleting the data received from the protection line 48 from the time of the switch to the time the match is identified.

Figure 6:
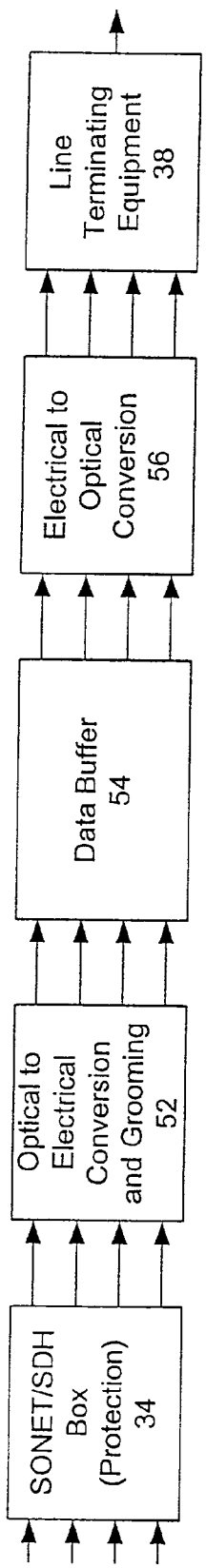
FIG. 6 is a block diagram of data buffer in the zero data loss network protection system of FIG. 3, consistent with the present invention.

FIG. 6 is a block diagram of a data buffer in the zero data loss network protection system of FIG. 3, consistent with the present invention. As shown in FIG. 6, along the protection path on the transmission side, the zero data loss network protection system includes an optical to electrical conversion and grooming (o/e converter) circuit 52, a data buffer 54, and an electrical to optical (e/o) converter 56 between the transmission protocol device 34 and the LTE 38. The o/e converter 52, data buffer 54 and e/o converter 56 may all be located in the transmission protocol device 34, in the LTE 38 or elsewhere in the protection path prior to the LTE 40.

The data buffer 54 preferably includes a read/write SDRAM. The size of the data buffer 54 depends on the data rates of the data signals and the data delay amount $T_{DD}$. For example, if the data delay amount $T_{DD}$ is 50 milliseconds, and the data rate is 10 gigabits per second, the data buffer 54 would need to have at least a 500 megabit capacity. In addition to the size, the data buffer 54 is preferably implemented to have a throughput consistent with the data rate of the received data signal.

Figure 7:
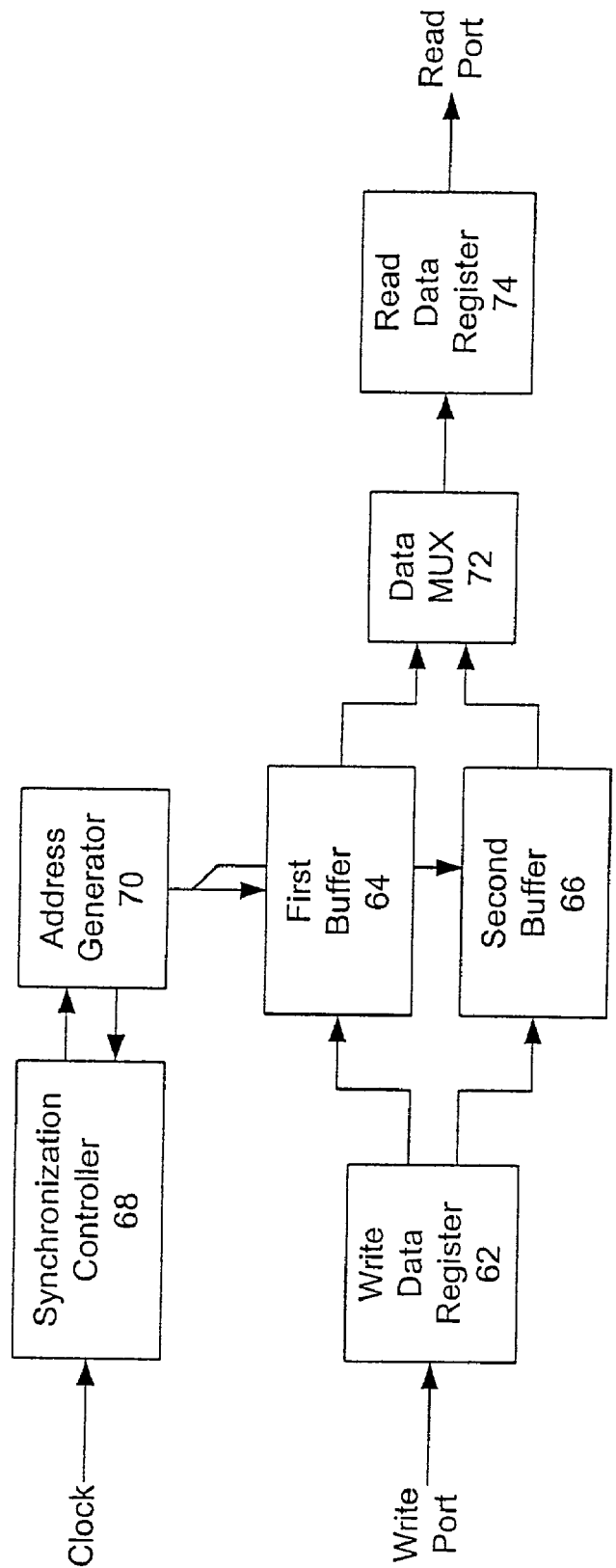
FIG. 7 is a block diagram of the data buffer of FIG. 6 implemented with a double-buffering scheme, consistent with the present invention.

Since SDRAM devices are typically single port devices, only a single read or write operation may occur at any one time. To maximize memory bandwidth and the throughput, a double-buffering scheme may be used, which provides two identical buffers that are operated in a ping-pong fashion. FIG. 7 shows a block diagram of the data buffer 54 implemented with a double-buffering scheme. As shown in FIG. 7, the data buffer 54 includes a write data register 62, a read data register 74, a first buffer 64, a second buffer 66, a synchronization controller 68, an address generator 70 and a data multiplexer (MUX) 72.

At any one point in time in the operation of the data buffer 54 shown in FIG. 7, data is received at the write port by the write data register 62 and is written into either the first buffer 64 or second buffer 66, which are preferably implemented as SDRAM. At the same time, the other of the first buffer 64 and the second buffer 66 is either read or emptied of previously written data. As a result, the read and write operations to the two buffers occur simultaneously, but to different buffers. Once the buffer being written to is full and the other buffer is empty, a synchronous switch occurs, as controlled by the synchronization controller 68 and the address generator 70. After the synchronous switch, incoming data is written into the empty buffer, while outgoing data is read from the full buffer.

The address generator 70 provides sequential addresses to both the first buffer 64 and the second buffer 66. Since the two buffers are synchronized to each other, only one address is needed. At any one point in time, a write is occurring to one buffer while a read is occurring at the other buffer, where both the read and write operations occur at the same address.

The synchronization controller 68 controls the overall operation of the data buffer 54. At the beginning of a cycle, the synchronization controller 68 signals the address generator 70 to begin generating addresses to the first buffer 64 and the second buffer 66. The address generator 70 also controls the selection of the buffer for writing and reading, such as by controlling a toggle switch that either writes to the first buffer 64 and reads from the second buffer 66 or reads from the first buffer 64 and writes to the second buffer 66. The write data register 62 and the read data register 74 are used to synchronize the data between external interfaces to the data buffer 54 and the first buffer 64 and the second buffer 66. The clock signal provides timing control for the data buffer 54 logic.

When the data buffer 54 is implemented as a digital storage device, such as the SDRAM, the o/e converter 52 and the e/o converter 56 are included to convert the optical signals to electrical signals for writing into the data buffer 54 and to convert the electrical signals read from the data buffer 54 into optical signals. Instead of a digital storage device, the data buffer 54 may be implemented as an optical buffer. In that case, it is unnecessary to include the o/e converter 52 and the e/o converter 56. The converters may also be unnecessary for the digital data buffer depending on the location of the data buffer, as the LTE 38 typically converts the optical data signals received from the transmission protocol device 34 into electrical data signals to perform some processing on the data signals before transmitting them on the protection line 48. It therefore may be possible to insert the data buffer 54 into the LTE 38 where the data signals have already been converted to electrical signals.

Figure 8:
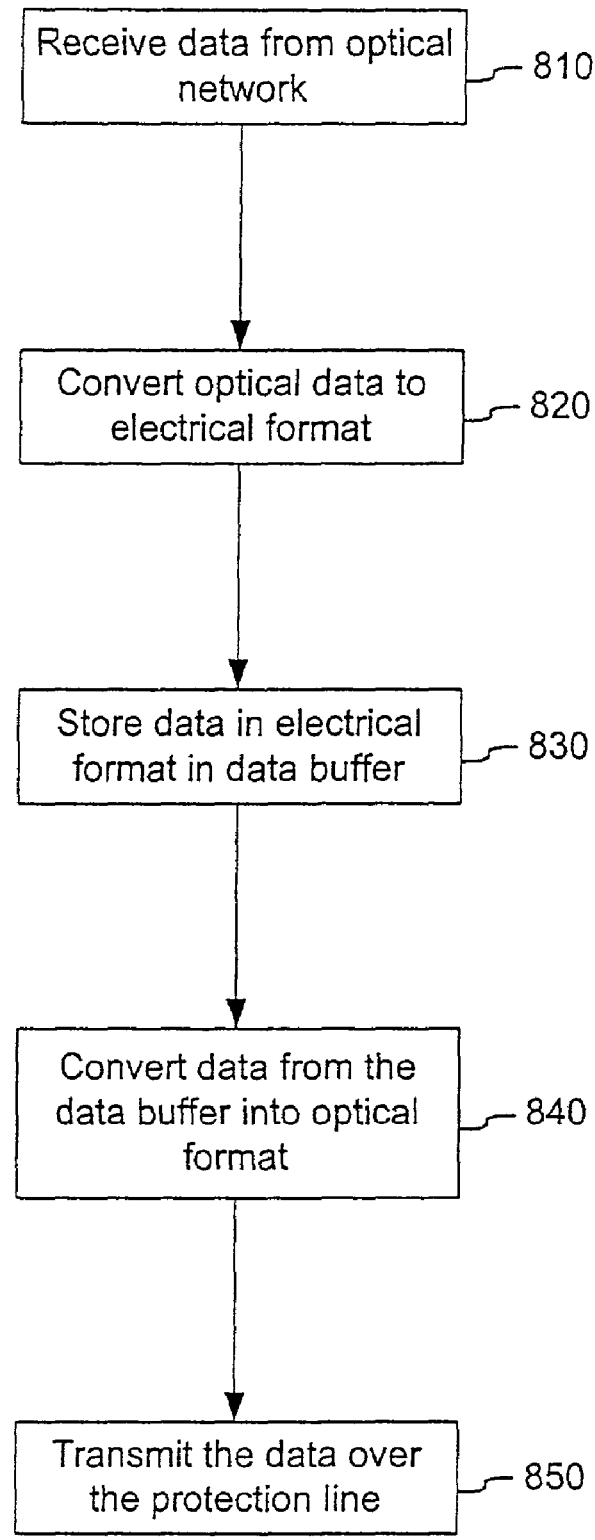
FIG. 8 is a flow diagram for the zero data loss process using the data buffer of FIG. 6, consistent with the present invention.

FIG. 8 is a flow diagram for the zero data loss process using the data buffer of FIG. 6, consistent with the present invention. As shown in FIG. 8, data is received from an optical network (step 810). With respect to FIG. 6, the data is received by the transmission protocol device 34. The data received by the transmission protocol device 34 is converted from an optical signal to an electrical signal (step 820). The conversion is performed by the o/e converter 52. As described above, the conversion may be unnecessary if the data buffer 54 is implemented as an optical buffer or if the data buffer 54 is located in the LTE 38 after the optical data signals have already been converted to electrical data signals.

After the conversion, the data is stored in the data buffer 54 (step 830). The size of the data buffer 54 is sufficient to store the amount of data that would be transmitted during the data delay amount $T_{DD}$. The data read from the data buffer 54 is then converted back into an optical data signal (step 840) and transmitted over the protection line 48 (step 850).

In addition to including the data buffer 54 prior to the transmission over the protection line 48, it is possible to include the data buffer 54 on the reception side, such as within or prior to the protection switch 42. In this case, the data read from the data buffer 54 already would have been transmitted over the protection line 48.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for protecting from the loss of data in an optical data network, comprising:
   receiving the data over a service optical fiber line;
   delaying reception of the data over a protection optical fiber line by a first delay amount with respect to the reception of the data over the service optical fiber line including storing a first amount of the data in a buffer coupled to the protection optical fiber line, the first amount of the data corresponding to at least the amount of data that is transmitted over the service optical fiber line during the first delay amount, wherein the storing includes:
   converting the data from an optical format to an electrical format;
   placing the data in the electrical format into the buffer; and
   converting the data in the buffer from the electrical format to the optical format for placement on the protection optical fiber line;
   detecting a fault condition in the service optical fiber line; and
   receiving the transmission of data over the protection optical fiber line in response to the detection of the fault condition,
   wherein the first delay amount corresponds to at least the amount of time to switch to the reception of the data over the protection optical fiber line from the reception of the data over the service optical fiber line after the detection of the fault condition.

2. A method as recited in claim 1, further comprising:
   storing the portion of the data received over the service optical fiber line when the fault is detected;
   comparing the data received over the protection optical fiber line to the stored portion of the data; and
   synchronizing the stored portion of the data with the data received over the protection optical fiber line based on a result of the comparison.

3. A method as recited in claim 2, wherein the synchronizing comprises:
   removing the data received over the protection optical fiber line that has already been received over the service optical fiber line.

4. A method for protecting from the loss of data in an optical data network, comprising:
   transmitting the data over a service optical fiber line and a protection optical fiber line; and
   delaying the transmission of the data over the protection optical fiber line by a first delay amount with respect to the transmission of the data over the service optical fiber line including storing a first amount of the data in a buffer coupled to the protection optical fiber line, the first amount of the data corresponding to at least the amount of data that is transmitted over the service optical fiber line during the first delay amount, wherein the storing includes:
   converting the data from an optical format to an electrical format;
   placing the data in the electrical format into the buffer; and
   converting the data in the buffer from the electrical format to the optical format for placement on the protection optical fiber line.

5. A method as recited in claim 4, wherein the first delay amount corresponds to at least the amount of time to switch to receiving the data over the protection optical fiber line from receiving the data over the service optical fiber line after detection of a fault condition in the service optical fiber line.

6. A system for protecting from the loss of data in an optical data network, comprising:
   a transmitting terminal which transmits the data;
   a receiving terminal which receives the data transmitted by the transmitting terminal;
   a service optical fiber line which propagates the data from the transmitting terminal to the receiving terminal;
   a protection optical fiber line which propagates the data from the transmitting terminal to the receiving terminal;
   a switch, coupled to the receiving terminal and to the service and protection optical fiber lines, the switch providing data to the receiving terminal from the service optical fiber line during normal operation and from the protection optical fiber line when a fault is detected in the service optical fiber line; and
   a delay circuit for delaying the transmission of the data propagating on the protection optical fiber line wherein the delay circuit comprises:
      a buffer, coupled to the protection optical fiber line, which stores a first amount of the data prior to the data being transmitted over the protection optical fiber line, the first amount of the data corresponding to at least the amount of data that is transmitted over the service optical fiber line during the delay amount;
      a first converter which converts the data from an optical format to an electrical format prior to placing the data in the buffer; and
      a second converter which converts the data in the buffer from the electrical format to the optical format prior to placing the data on the protection optical fiber line.

7. A system as recited in claim 6, wherein the delay circuit imparting a delay amount at least equal to an amount of time between the detection of the fault in the service optical fiber line and the switch providing data to the receiving terminal from the protection optical fiber line.

8. A system as recited in claim 6, further comprising:
   a storage device which stores the portion of the data received over the service optical fiber line when the fault is detected;
   a comparator which compares the data received over the protection optical fiber line to the portion of the data stored in the storage device; and a synchronization circuit which synchronizes the portion of the data stored in the storage device with the data received over the protection optical fiber line based on a result of the comparison.

9. A system as recited in claim 8, wherein the synchronization circuit comprises:
a sub-circuit configured to remove the data received over the protection optical fiber line that has already been received over the service optical fiber line.

10. A system as recited in claim 6, wherein the transmitting terminal comprises;
first and second transmission control devices; and
first and second line terminating equipment coupled to a respective one of the first and second transmission control devices and coupled to a respective one of the service optical fiber line and the protection optical fiber line.

11. A system as recited in claim 10, wherein the delay circuit is located in one of the first and second transmission control devices.

12. A system as recited in claim 10, wherein the delay circuit is located in the first or second line terminating equipment that is coupled to the protection optical fiber line.

13. A system as recited in claim 10, wherein the first and second transmission protocol devices are one of a SONET box, an SDH box and an IP router.

14. A system for protecting from the loss of data in an optical data network, comprising:
a receiving terminal which receives the data from one of a service optical fiber line and a protection optical fiber line;
a switch, coupled to the receiving terminal and to the service and protection optical fiber lines, the switch providing data to the receiving terminal from the service optical fiber line during normal operation and from the protection optical fiber line when a fault is detected in the service optical fiber line; and
a delay circuit for delaying the transmission of the data propagating on the protection optical fiber line wherein the delay circuit comprises:
a buffer, coupled to the protection optical fiber line, which stores a first amount of the data, the first amount of the data corresponding to at least the amount of data that is transmitted over the service optical fiber line during the delay amount; and
a first converter which converts the data from an optical format to an electrical format prior to placing the data in the buffer; and
a second converter which converts the data in the buffer from the electrical format to the optical format prior to placing the data on the protection optical fiber line.

15. A system as recited in claim 14, wherein the delay circuit imparting a delay amount at least equal to an amount of time between the detection of the fault in the service optical fiber line and the switch providing data to the reception circuit from the protection optical fiber line.

16. A system as recited in claim 14, further comprising:
a storage device which stores the portion of the data received over the service optical fiber line when the fault is detected;
a comparator which compares the data received over the protection optical fiber line to the portion of the data stored in the storage device; and
a synchronization circuit which synchronizes the portion of the data stored in the storage device with the data received over the protection optical fiber line based on a result of the comparison.

17. A system as recited in claim 16, wherein the synchronization circuit comprises:
a sub-circuit configured to remove the data received over the protection optical fiber line that has already been received over the service optical fiber line.

18. A system as recited in claim 14, wherein the receiving terminal comprises:
a transmission control device; and
line terminating equipment coupled to the transmission control device.

19. A system as recited in claim 18, wherein the delay circuit is located in one of the line terminating equipment and the switch.

20. A system as recited in claim 18, wherein the transmission protocol device is one of a SONET box, an SDH box and an IP router.

21. A system for protecting from the loss of data in an optical data network, comprising:
a transmitting terminal which transmits the data over a service optical fiber line and a protection optical fiber line; and
a delay circuit for delaying the transmission of the data propagating on the protection optical fiber line wherein the delay circuit comprises:
a buffer, coupled to the protection optical fiber line, which stores a first amount of the data prior to the data being transmitted over the protection optical fiber line, the first amount of the data corresponding to at least the amount of data that is transmitted over the service optical fiber line during the delay amount;
a first converter which converts the data from an optical format to an electrical format prior to placing the data in the buffer; and
a second converter which converts the data in the buffer from the electrical format to the optical format prior to placing the data on the protection optical fiber line.

22. A system as recited in claim 21, wherein the delay circuit imparting a delay amount at least equal to an amount of time between detection of a fault in the service optical fiber line and a switch to receiving data at a receiving terminal from the protection optical fiber line.

23. A system as recited in claim 21, wherein the transmitting terminal comprises:
first and second transmission control devices; and
first and second line terminating equipment coupled to a respective one of the first and second transmission control devices and coupled to a respective one of the service optical fiber line and the protection optical fiber line.

24. A system as recited in claim 23, wherein the delay circuit is located in one of the first and second transmission control devices.

25. A system as recited in claim 23, wherein the delay circuit is located in the first or second line terminating equipment that is coupled to the protection optical fiber line.

26. A system as recited in claim 23, wherein the first and second transmission protocol devices are one of a SONET box, an SDH box and an IP router.

* * * * *